United States Patent [19]

Nattel

[11] Patent Number: 4,575,132

[45] Date of Patent: Mar. 11, 1986

[54] CONDUIT CONNECTOR WEDGE TYPE

[75] Inventor: William Nattel, Montreal, Canada

[73] Assignee: Commander Electrical Materials, Inc., Quebec, Canada

[21] Appl. No.: 647,241

[22] Filed: Sep. 4, 1984

[30] Foreign Application Priority Data

May 31, 1984 [CA] Canada .................................. 455600

[51] Int. Cl.[4] .............................................. F16L 5/00
[52] U.S. Cl. .................................. 285/194; 285/205; 285/421; 285/DIG. 4
[58] Field of Search ................. 285/192, 194, DIG. 4, 285/421, 317, 205

[56] References Cited

U.S. PATENT DOCUMENTS

| | | | |
|---|---|---|---|
| 1,542,421 | 6/1925 | Strongson | 285/194 X |
| 1,793,881 | 2/1931 | Thomas | 285/194 |
| 2,475,574 | 7/1949 | Taylor | 285/205 |
| 4,368,904 | 1/1983 | Lanz | 285/DIG. 4 |

FOREIGN PATENT DOCUMENTS 73892 3/1983 European Pat. Off. ...... 285/DIG. 4

Primary Examiner—Richard J. Scanlan, Jr.
Attorney, Agent, or Firm—Larson and Taylor

[57] ABSTRACT

Connector means for use in connecting a corrugated conduit, of the type having longitudinally spaced-apart circular ribs on at least its outer surface, to an electrical box or other members. The connector means, in one embodiment, employs a tubular element on the box and the tubular element is provided with a slot. The conduit is axially inserted into the tubular element. A wedge is wedged in the slot so as to project into a groove between two adjacent ribs on the conduit to secure the conduit in the tubular element. In another embodiment, the connector means includes a wall in the box having a hole through which the conduit is passed. A wedge is inserted in the gap between the wall edge defining the hole, and the conduit, to lock the conduit in place.

5 Claims, 11 Drawing Figures

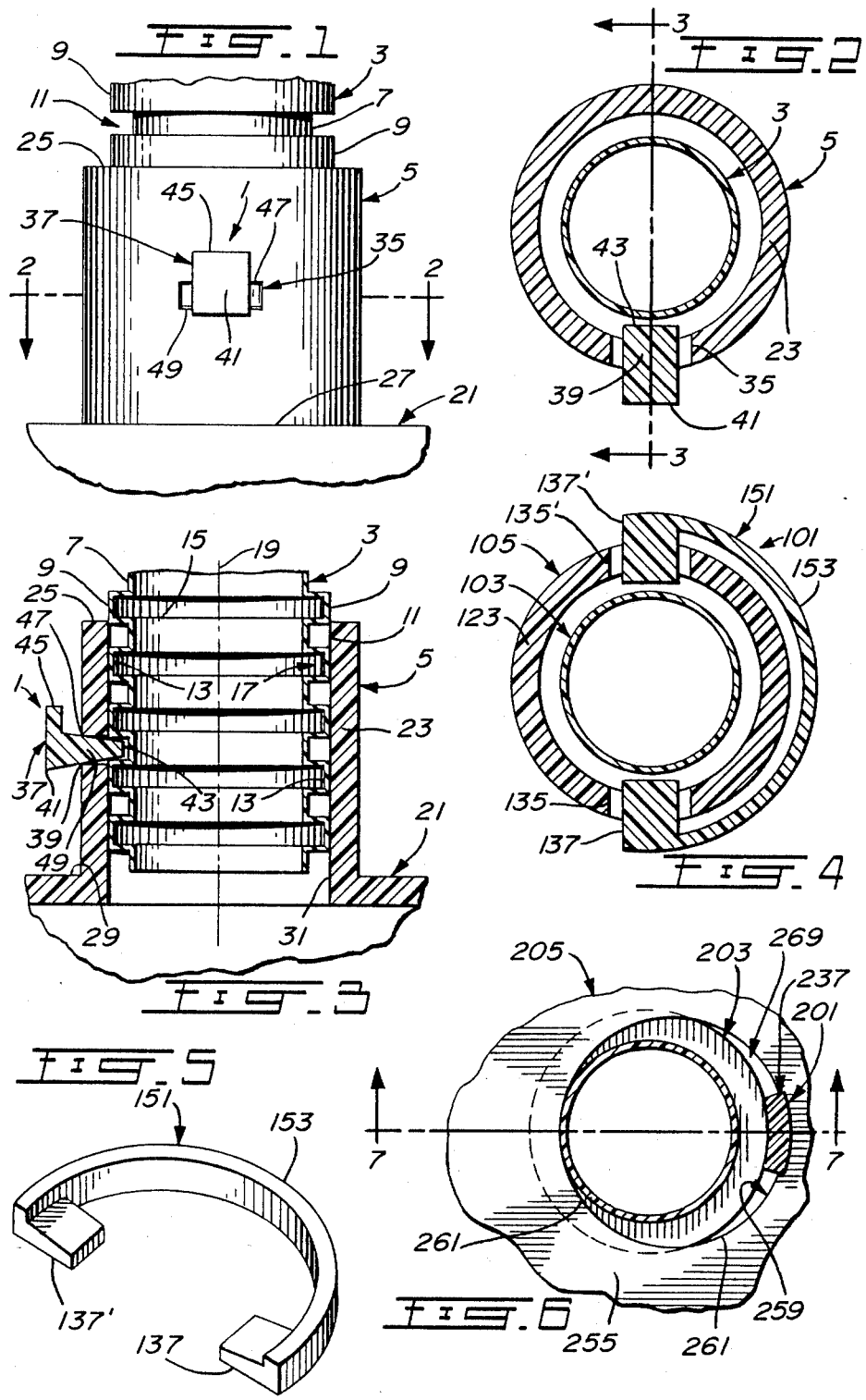

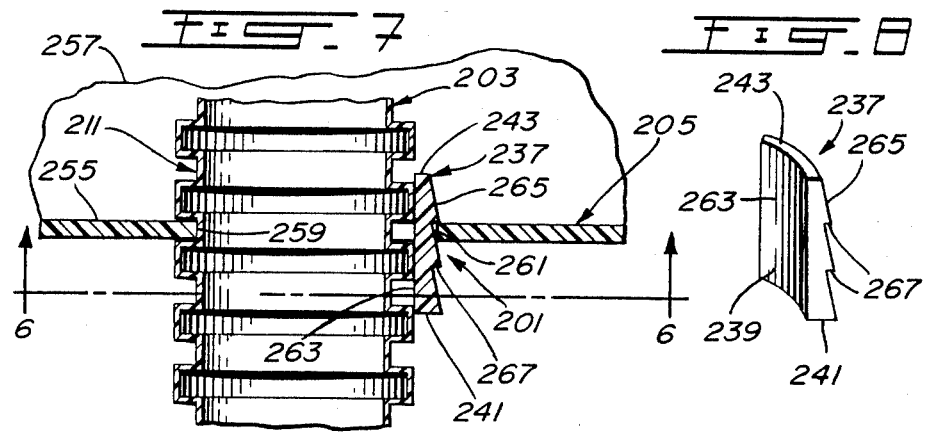
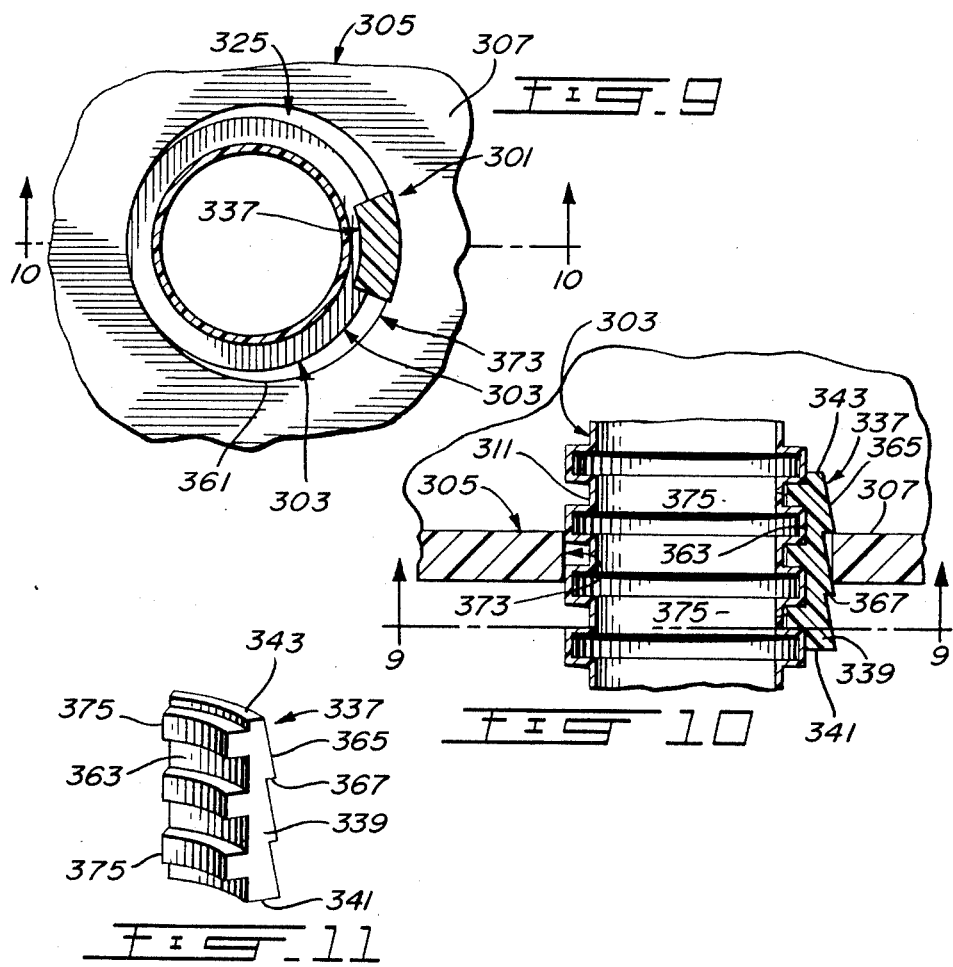

CONDUIT CONNECTOR WEDGE TYPE

This invention is directed toward connector means for use in connecting a corrugated conduit to another member.

Corrugated conduit is now being used as electrical conduit. The corrugated, electrical conduit is defined by a series of longitudinally spaced-apart, circular ribs on its outer surface. The conduit can also include a series of longitudinally spaced-apart circular ribs on its inner surface. The conduit is normally extruded from plastic material and is light-weight, flexible and easy to work with while providing the required protection for the electrical wires or cable it carries.

Known spiral or metallic conduits are connected to electrical boxes with built-in, or separate connectors, that clamp onto the conduits, and also the boxes if needed. These known connectors however normally require tools to make the connection since a fastener usually provides the clamping action. The known connectors are relatively expensive and time consuming.

It has been found that the new plastic, corrugated conduit lends itself to use with novel connectors that do not require tools to make the connection and which allow the connections to be made simply and rapidly. In one form, the connectors can employ resilient fingers to connect the conduit to another member as shown in my co-pending Patent Application Ser. No. 644,360 filed Aug. 27, 1984 and entitled CONDUIT CONNECTOR. The present invention is directed toward another type of novel connector employing wedges which together, or in conjunction with the grooves between the outer ribs on the conduit, lock the conduit to another member such as a connection box.

The wedges are inserted through slots in a tubular fitting on an electrical box and project into grooves between the ribs of a conduit axially inserted into the fitting to prevent the removal of the conduit from the fitting. In another embodiment, the wedges are inserted between the conduit and the edge of an aperature in a wall of a box, through which aperature the conduit passes. The wedges lock the conduit against relative movement to the wall.

The wedges are very simple and inexpensive to manufacture, and easy to use. The wedges are manually pushed into locking position and no tools are required to make the connection.

The invention, in its broadest aspect, is particularly directed toward connector means for use in connecting a corrugated conduit to another member. The conduit is of the type having longitudinally spaced-apart, circular ribs on at least its outer surface and the member has means for receiving the conduit. The connector means comprises at least one wedge, and means on the member receiving each wedge, whereby when the member receives the conduit and each wedge, each wedge locks the conduit to the member.

The invention will now be described in detail having reference to the accompanying drawings in which:

FIG. 1 is a plan view of one embodiment of the connector means of the present invention;

FIG. 2 is a cross-section view taken along line 2—2 of FIG. 1;

FIG. 3 is a cross-section view taken along line 3—3 of FIG. 2;

FIG. 4 is a cross-section view similar to FIG. 2 showing another embodiment of the connector means;

FIG. 5 is a perspective view of the wedge element used in the connector means shown in FIG. 4;

FIG. 6 is a cross-section view similar to FIG. 2 showing a further embodiment of the connector means;

FIG. 7 is a cross-section view taken along line 7—7 of FIG. 6;

FIG. 8 is a perspective view of the wedge element used in the connector means shown in FIG. 6;

FIG. 9 is a cross-section view similar to FIG. 2 showing yet another embodiment of the connector means;

FIG. 10 is a cross-section view taken along line 10—10 of FIG. 9; and

FIG. 11 is a perspective view of the wedge element used in the connector means shown in FIG. 9.

The connector means 1 of the present invention, as shown in FIGS. 1 to 3, is designed to connect a plastic, corrugated conduit 3 to another member 5. The conduit 3 is normally electrical conduit of the type having an outer cylindrical surface 7 with a series of longitudinally spaced-apart ribs 9 extending outwardly from the outer surface 7. Channels or grooves 11 are formed between the outer ribs 9. The conduit 3 can also have an inner cylindrical surface 13 with a series of longitudinally spaced-apart ribs 15 extending inwardly from its inner surface 13. Channels or grooves 17 are formed between the inner ribs 15. The inner ribs 15 define the outer grooves 11, and the outer ribs 9 define the inner grooves 17 in the corrugated conduit. The ribs 9, 15 are circular, extending transverse to the longitudinal axis 19 of the conduit 3. Each rib 9, 15 has a rectangular or trapezoidal cross-sectional shape.

The member 5, to which the conduit 3 is to be connected by the connecting means 1, normally forms part of a piece of electrical equipment, such as a connector or service box 21. The member 5, as shown in FIGS. 1 to 3 comprises a short, tubular element having a cylindrical wall 23 and ends 25, 27. The member 5 is fixed at one end 27 to the wall 29 of the box 21 and is aligned with an access hole 35 in the wall 29. The other end 25 of the member 5 is free to receive one end of a conduit 3 which is to be connected to the member 5.

The connecting means 1 has at least one circumferential-extending slot 35 in the wall 23 of the member 5, about midway between its ends 25, 27. The length of the slot 35 is relatively short compared to the circumference of the member 3. For example, the slot 35 can cover about 30° of the circumference of the member 3. The connecting means 1 includes a wedge 37. The wedge 37 has a main body 39 which tapers down in thickness from its thicker outer end 41 to its thinner inner end 43, its thickness about midway between its ends 41, 43 being about equal to the thickness of slot 35. The wedge 37 is slightly narrower than the width of the slot 35 and has a raised rib 45 on the body 39 at its outer end 41 for use in removing the wedge.

In using the connector means 1, the conduit 3 is inserted into the tubular member 5 and positioned to have one outer groove 11 generally aligned with slot 35 in member 5. The wedge 37 is then pushed into slot 35 with its inner end 43 entering a groove 11 on the conduit 3 while the body 39 of the wedge 37 is jammed between the top and bottom outer edges 47, 49 of the slot 35. The wedge 37 now prevents withdrawal of the conduit 3 locking it to the member 5. The wedge 37 can be removed from the member 5 by levering the rib 45 away from the wall 23 of member 5 with a screwdriver or similar tool.

While the connector means 1 has been described as consisting of one slot 35 and one wedge 37, it can also consist of two or more slots 35 in the wall 23 of member 5 with a wedge 37 for each slot. In one particular embodiment of the invention, shown in FIGS. 4, 5, the connector means 101 for joining a conduit 103 to a member 105 can comprise a pair of diametrically opposed slots 135, 135' in the wall 123 of the member 105. The connector means 101 includes a wedge element 151 consisting of a pair of wedges 137, 137' each similar to wedge 37, and joined by a semi-circular flexible band 153. The wedge element 151 locks the conduit 103 to the member 105 by the insertion of the wedges 137, 137' into slots 135, 135' respectively and into a groove 111 on the conduit 103. The band 153 simplifies handling of the wedges 137, 137'.

A further embodiment of the invention is shown in FIGS. 6 to 8. In this embodiment, connector means 201 are used to connect a conduit 203 to a member 205. In this embodiment, the member 205 comprises a thin wall 255 in a connector box 257 having an access opening 259 through which the conduit 203 is passed. The wall 255 is thin enough to fit within any one of the outer grooves 211 on the conduit 203. The connector means 201 in this embodiment includes the edge 261 of the wall 255 defining the access opening 259. The access opening 259 is preferably circular and slightly larger than the conduit 203. The opening 259 can also be oval in shape if desired. The connector means 201 also includes a wedge 237. This wedge 237 has a main body 239 which tapers down in thickness from a thick end 241 to a thin end 243. The body 239 is curved, when viewed from either end 241, 243 having a radius of curvature about the same as the radius of the access opening 259. The inner concave surface 263 of the wedge 237 is smooth while the outer convex surface 265 can be stepped as shown at 267 with the steps 267 helping to lock the wedge in place.

In use, the conduit 203 is inserted through the access opening 259 in the wall 255 of the member 205. Once in place, the conduit 203 is moved laterally of the wall 255 to insert a portion of the edge 261 of the wall 255 defining opening 259, into a groove 211 on the conduit 203. In effect, the conduit 203 is offset with respect to the opening 259 leaving a gap 269 between the wall 255 and the conduit 203 on the side of the conduit diametrically opposite that portion of the conduit which receives the edge 261 of the wall 255. The wedge 237 is now pushed through this gap 269 in a direction generally parallel to the longitudinal axis of the conduit 203 with its smooth surface 263 adjacent the conduit 203 and its stepped surface 265 adjacent the edge 261 of the wall 255. The wedge 237 is pushed tight to lock a step 267 with the edge 261 of the wall 255 while the portion of the edge 261 in the groove 211 holds the conduit 203 in place.

A slightly different embodiment of the connector means 201 is shown in FIGS. 9 to 11. In this embodiment, the connector means 301 connects a conduit 303 to a member 305, the member 305 being a thick wall 307 in a connector box having an access opening 373 through which the conduit 303 is passed. In this embodiment, the wall 307 is too thick to fit in any one of the grooves 311 of the conduit 303. The access opening 373 is made large enough so that a gap 325 is formed between the conduit 303 and the edge 361 of the wall 307 defining the opening 373.

A wedge 337 is provided as part of the connector means, similar in shape to wedge 237 and having a main body 339 which tapers down in thickness from a thick end 341 to a thin end 343. The body 339 is again curved, when viewed from either end 341, 343, having a radius of curvature about the same as the radius of curvature of the opening 373. The outer convex surface 365 of the wedge 337 is stepped as shown at 367. The wedge 337 differs from wedge 237 in having transverse ribs 375 on its inner concave surface 363. The ribs 375 are sized, and longitudinally spaced-apart, to fit in the outer grooves 311 of the conduit 303.

In use the wedge 337 is fitted onto the conduit with its ribs 375 entering the grooves 311 on the conduit 373. The conduit 303 and its associated wedge 337 are forced into the access opening 373 in the wall 307 on the box 371, tightly wedging wedge 337 in the gap 325 between the conduit 303 and the edge 361 of the opening 373, thus locking the conduit in place.

Each embodiment employs wedges which can be easily and cheaply manufactured, such as by plastic molding. In addition, the wedges are easily, manually inserted in place to lock the conduit, without requiring the use of tools.

The embodiments of the invention in which an exclusive property or privilege is claimed are defined as follows:

1. Connector means for use in connecting a corrugated conduit to a member, wherein the conduit is of the type having longitudinally spaced apart circular ribs on at least its outer surface; the member comprising a tubular element defined by a cylindrical wall into which the conduit is axially inserted; the connector means comprising:

at least one wedge having a narrow end and a wide end, the wedge tapering down to the narrow end from the wide end; the narrow end having a thickness less than the space between any two adjacent ribs on the conduit; and a cooperating, closed slot for the wedge in the wall of the tubular element, said slot extending in a circumferential direction and having a dimension in a direction parallel to the longitudinal axis of the tubular element that is greater than the thickness of the small end of the wedge and less than the thickness of the wide end of the wedge, and said slot having a dimension in the circumferential direction that is wider than the width of the wedge, such that when the tubular element axially receives the conduit, the wedge can be radially inserted in the slot toward the longitudinal axis of the tubular element to have its narrow end enter in a space between adjacent ribs on the conduit to lock the conduit in the tubular element while the wedge itself is tightly wedged between the longitudinally spaced apart edges of the slot to retain it in place.

2. Connector means as claimed in claim 1 wherein the connector means includes two wedges joined together by a part-circular flexible band with the narrow ends of the wedges generally facing each other.

3. Connector means as claimed in claim 2 wherein the connector means includes two slots in the wall of the tubular element which are generally diametrically opposed to each other.

4. Connector means for use in connecting a corrugated conduit to a member, the conduit being of the type having longitudinally spaced apart circular ribs on at least its outer surface, the member comprising a wall having an aperature just slightly larger than the largest diameter of the conduit so that the conduit can be freely passed through the aperature; the connector means comprising:
- a locking wedge having a concave inner surface and a convex outer surface and tapering in a direction generally parallel to the axis of convexity from a narrow end to a wide end, at least one step on the outer surface of the wedge extending transverse to its axis of convexity; the wall thickness being less than the distance between any two adjacent ribs on the conduit;
- whereby when the conduit is inserted axially through the aperature in the wall and then moved transversely, the edge of the wall on one side of the aperature enters the space between two adjacent ribs to hold the conduit against withdrawal, the locking wedge being then inserted axially, narrow end first, between the conduit and the edge of the wall on the side of the aperature opposite the one side with its concave inner side adjacent the conduit and its convex outer side adjacent the edge of the wall to hold the conduit in place, the step on the convex outer surface of the wedge cooperating with the edge of the wall to hold the wedge in place relative to the wall.

5. Connector means for use in connecting a corrugated conduit to a member, the conduit being of the type having longitudinally spaced apart circular ribs on at least its outer surface; the member comprising a wall having an aperature just slightly larger than the largest diameter of the conduit so that the conduit can be freely passed through the aperature; the connector means comprising:
- a locking wedge having a concave inner surface and a convex outer surface and tapering in a direction generally parallel to the axis of convexity from a narrow end to a wide end, at least one step on the outer surface of the wedge extending transverse to its axis of convexity; and at least one rib on the inner surface of the wedge extending parallel to the step, the rib sized to fit in the space between any two adjacent ribs on the conduit, such that when the conduit is inserted axially through the aperature in the wall, with the wedge lying adjacent the conduit with the rib on the wedge in a space between adjacent ribs on the conduit, the wedge will jam the conduit against the edge of the wall on one side of aperature while the wedge, with its step, locks against the edge of the wall on the other side of the aperature opposite the one side.

* * * * *